(12) United States Patent
Stenton

(10) Patent No.: US 7,728,988 B2
(45) Date of Patent: Jun. 1, 2010

(54) METHOD AND APPARATUS FOR TESTING CONIC OPTICAL SURFACES

(75) Inventor: William Conrad Stenton, Midland (CA)

(73) Assignee: Raytheon Company, Waltham, MA (US)

(*) Notice: Subject to any disclaimer, the term of this patent is extended or adjusted under 35 U.S.C. 154(b) by 136 days.

(21) Appl. No.: 12/018,859

(22) Filed: Jan. 24, 2008

(65) Prior Publication Data

US 2009/0190137 A1    Jul. 30, 2009

(51) Int. Cl.
*G01B 11/02* (2006.01)
*G02B 5/08* (2006.01)

(52) U.S. Cl. ...................... 356/512; 359/838

(58) Field of Classification Search ......... 356/512–513; 359/838, 857–859
See application file for complete search history.

(56) References Cited

U.S. PATENT DOCUMENTS

| | | | | |
|---|---|---|---|---|
| 3,784,836 A * | 1/1974 | Tolliver | ................. | 250/495.1 |
| 4,084,887 A * | 4/1978 | Sigler | .................. | 359/853 |
| 5,864,402 A * | 1/1999 | Stenton | ................. | 356/515 |
| 6,634,759 B1 * | 10/2003 | Li | ..................... | 359/853 |
| 2006/0120429 A1 * | 6/2006 | Murakami | ............. | 372/107 |

* cited by examiner

*Primary Examiner*—Michael A Lyons
(74) *Attorney, Agent, or Firm*—Haynes and Boone, LLP

(57) ABSTRACT

According to one aspect, a part has two reflective surfaces, one being a conic surface portion having an axis with a focus thereon, and the other being part of a spherical surface with a centerpoint at the focus. According to a different aspect, a method includes fabricating a part with first and second reflective surfaces, the first being a conic surface portion with an axis and a focus on the axis, and the second being a spherical surface portion with a centerpoint at the focus. The second surface is used to position the part so that the focus coincides with the centerpoint of a spherical wave from an interferometer. Then, a reflective further spherical surface portion on a member is used with the interferometer to position a centerpoint of the further surface at the focus. The interferometer then evaluates the first surface for accuracy.

16 Claims, 9 Drawing Sheets

METHOD AND APPARATUS FOR TESTING CONIC OPTICAL SURFACES

FIELD OF THE INVENTION

This invention relates in general to techniques for testing optical surfaces and, more particularly, to techniques for testing conic optical surfaces.

BACKGROUND

In the optical arts, it is often necessary to fabricate an optical component with a reflective optical surface. For example, a workpiece of optical material is mounted in a machine tool, and the tool is then used to carry out a diamond point turning operation that forms an optical surface on the workpiece. For some applications, the reflective optical surface is a conic surface, such as an ellipsoid, or paraboloid of revolution.

After the optical surface has been created, it is usually tested for accuracy, for example by using an interferometer. For test purposes, the optical surface needs to be mechanically aligned very accurately with respect to the interferometer. This is usually achieved by making a very precise test jig or fixture that mates with some mechanical feature on the workpiece. However, these test jigs or fixtures are relatively expensive, and can suffer from a build up of tolerances. Consequently, although pre-existing testing techniques and devices have been generally adequate for their intended purposes, they have not been satisfactory in all respects.

BRIEF DESCRIPTION OF THE DRAWINGS

A better understanding of the present invention will be realized from the detailed description that follows, taken in conjunction with the accompanying drawings, in which:

FIG. 7 shows a first operation in an operational sequence for positioning and testing the illustrated workpiece, the workpiece being shown in section for clarity.

DETAILED DESCRIPTION

Figure 1:
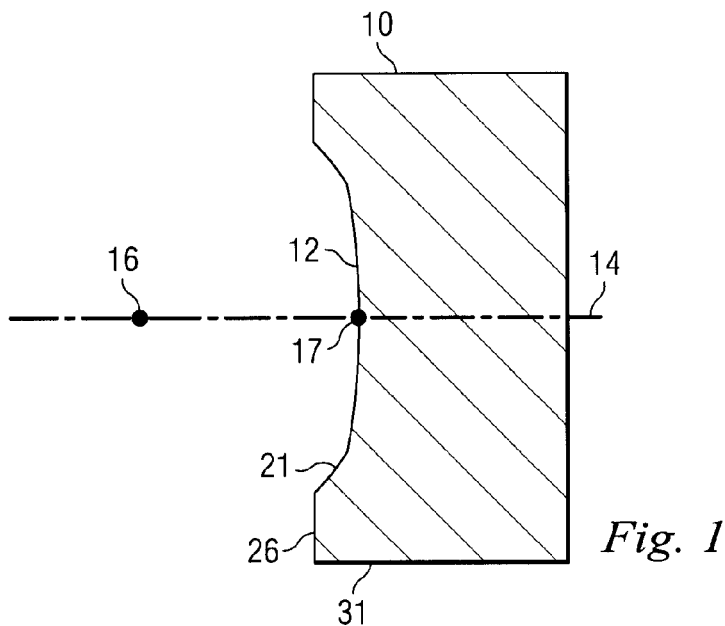
FIG. 1 is diagrammatic sectional side view of an apparatus that is an optical workpiece, and that embodies aspects of the present invention.

FIG. 1 is diagrammatic sectional side view of an apparatus that is an optical workpiece 10, and that embodies aspects of the present invention. In the disclosed embodiment, the workpiece 10 is a block of aluminum, but it could alternatively be made of any other suitable material. The workpiece 10 has a reflective optical surface 12 formed thereon. The surface 12 is a conic surface and, in the disclosed embodiment, is a paraboloid of revolution. In other words, the surface 12 has a shape that is swept out in space when a parabola is rotated about an axis 14, where the parabola has a focus 16 and a vertex 17 that both lie on the axis 14.

The workpiece 10 also has a further reflective optical surface 21 formed thereon. The surface 21 is annular, encircles the surface 12, and is a portion of a spherical surface that has its centerpoint coincident with the focus 16 of the surface 12. The surface 21 is used as a reference surface, in a manner explained later.

The workpiece 10 has a further reflective optical surface 26 formed thereon. The surface 26 is annular, encircles the surfaces 12 and 21, and is a portion of a planar surface that extends perpendicular to the axis 14. The surface 26 is used as a reference surface, in a manner explained later. The workpiece 10 has a radially outwardly facing cylindrical side surface 31.

In order to fabricate the illustrated workpiece 10, the workpiece 10 would typically be mounted in a not-illustrated machine tool such as lathe. The surface 31 can be used for accurate mechanical positioning of the workpiece 10 within the machine tool. Then, the machine tool would be used to machine all of the reflective optical surfaces 12, 21 and 26 on the workpiece 10, while the workpiece remained securely mounted in the lathe. In the disclosed embodiment, the optical surfaces 12, 21 and 26 are all formed by diamond point turning, but it would alternatively be possible to form them in any other suitable manner. Moreover, although it is contemplated that a lathe or other machine tool would be used to form these optical surfaces, it would alternatively be possible to form them in any other suitable manner.

Figure 2:
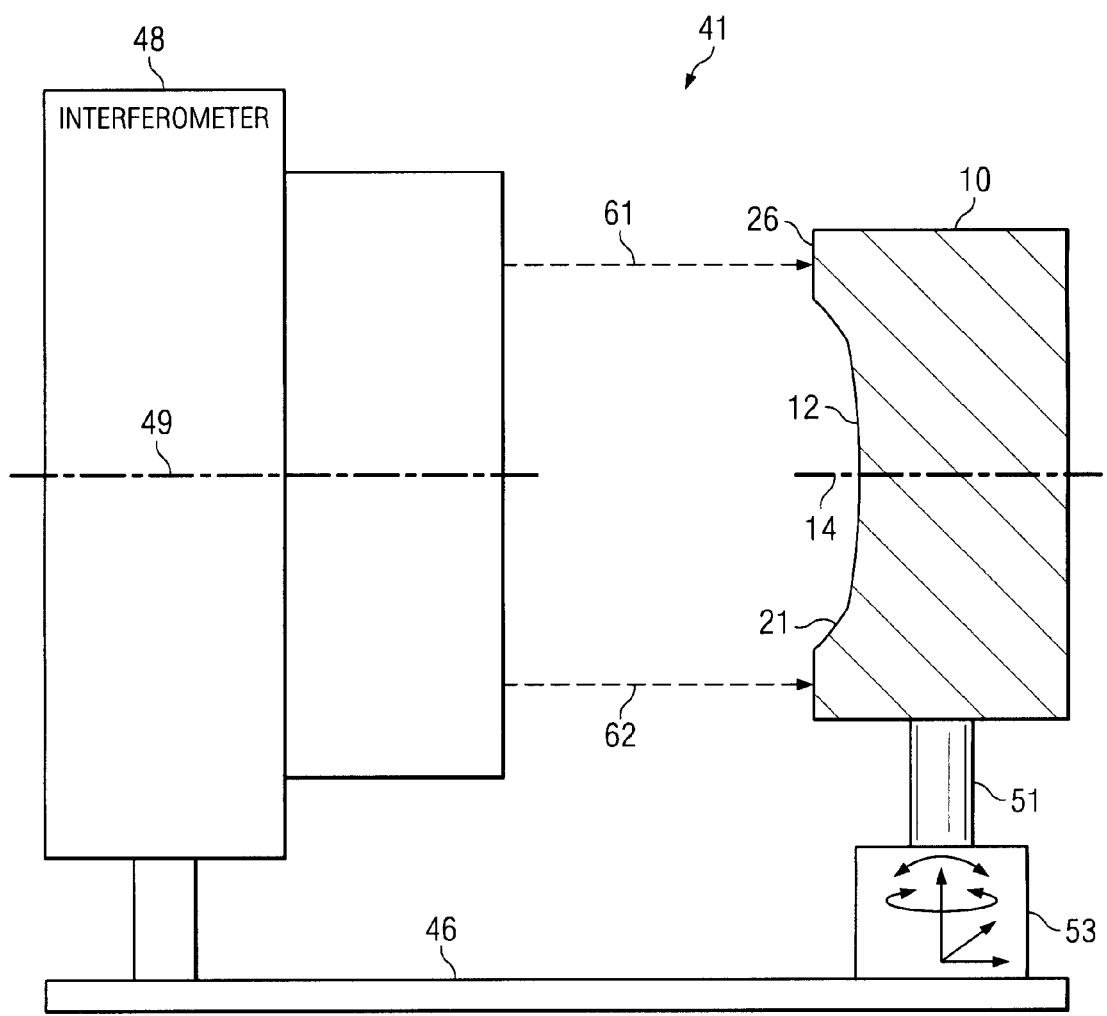
FIG. 2 is a diagrammatic side view of a test apparatus that has the workpiece of FIG. 1 removably mounted thereon, and that includes an interferometer, FIG. 2 showing a first operation in an operational sequence for positioning and testing the workpiece, and showing the workpiece in section for clarity.

After the optical surfaces 12, 21 and 26 have been formed on the workpiece 10, it is desirable to test the accuracy of the conic optical surface 12. In this regard, FIG. 2 is a diagrammatic side view of a test apparatus 41 having the workpiece 10 removably mounted thereon, the workpiece 10 being shown in section for clarity. The test apparatus 41 includes a base 46, and a interferometer 48 that is stationarily supported on the base 46. The interferometer 48 is a conventional type of device that is very well known to persons skilled in the art, and is therefore not shown and described in detail here. For the purpose of this discussion, it is sufficient to point out that the interferometer has an axis 49, and can selectively output either a flat wave that travels parallel to the axis 49, or a spherical wave that converges to a centerpoint located on the axis 49. If reflections from either type of wave arrive back at the interferometer 48, the interferometer 48 can analyze those reflections in a known manner.

The test apparatus 41 has a stage that includes both a member 51, and a 5-axis support mechanism 53 that supports the member 51 for movement with respect to the base 46. More specifically, the mechanism 53 supports the member 51 for linear movement parallel to any of three orthogonal axes of a Cartesian coordinate system, for rotational movement about a roughly vertical axis, and for tilting movement about a roughly horizontal axis. The workpiece 10 is fixedly and removably mounted on the member 51, with the optical surfaces 12, 21 and 26 facing toward the interferometer 48.

In order to test the optical surface 12 with the interferometer 48, the workpiece 10 first needs to be accurately positioned with respect to the interferometer 48. This positioning is achieved with a sequence of operations that is discussed below. First, with reference to FIG. 2, the interferometer 48 is set to output a flat wave in a direction parallel to its axis 49, as indicated diagrammatically by broken-line arrows 61 and 62 in FIG. 2. The annular planar reference surface 26 on the workpiece 10 reflects a portion of this flat wave back toward the interferometer 48, and the interferometer analyzes the reflection in a known manner in order to determine information such as the orientation of the surface that reflected the wave. While monitoring the results of the analysis being performed by the interferometer, the mechanism 53 is used to adjust the workpiece 10 in relation to the interferometer 48, until the interferometer indicates that the reflections from surface 26 are traveling perpendicular to the axis 49 of the interferometer 48. At this point, the axis 14 of the workpiece 10 will be parallel to the axis 49 of the interferometer 48. This does not necessarily mean that the axis 14 is coaxial with the axis 49, as there may possibly be some radial offset between these two parallel axes.

Figure 3:
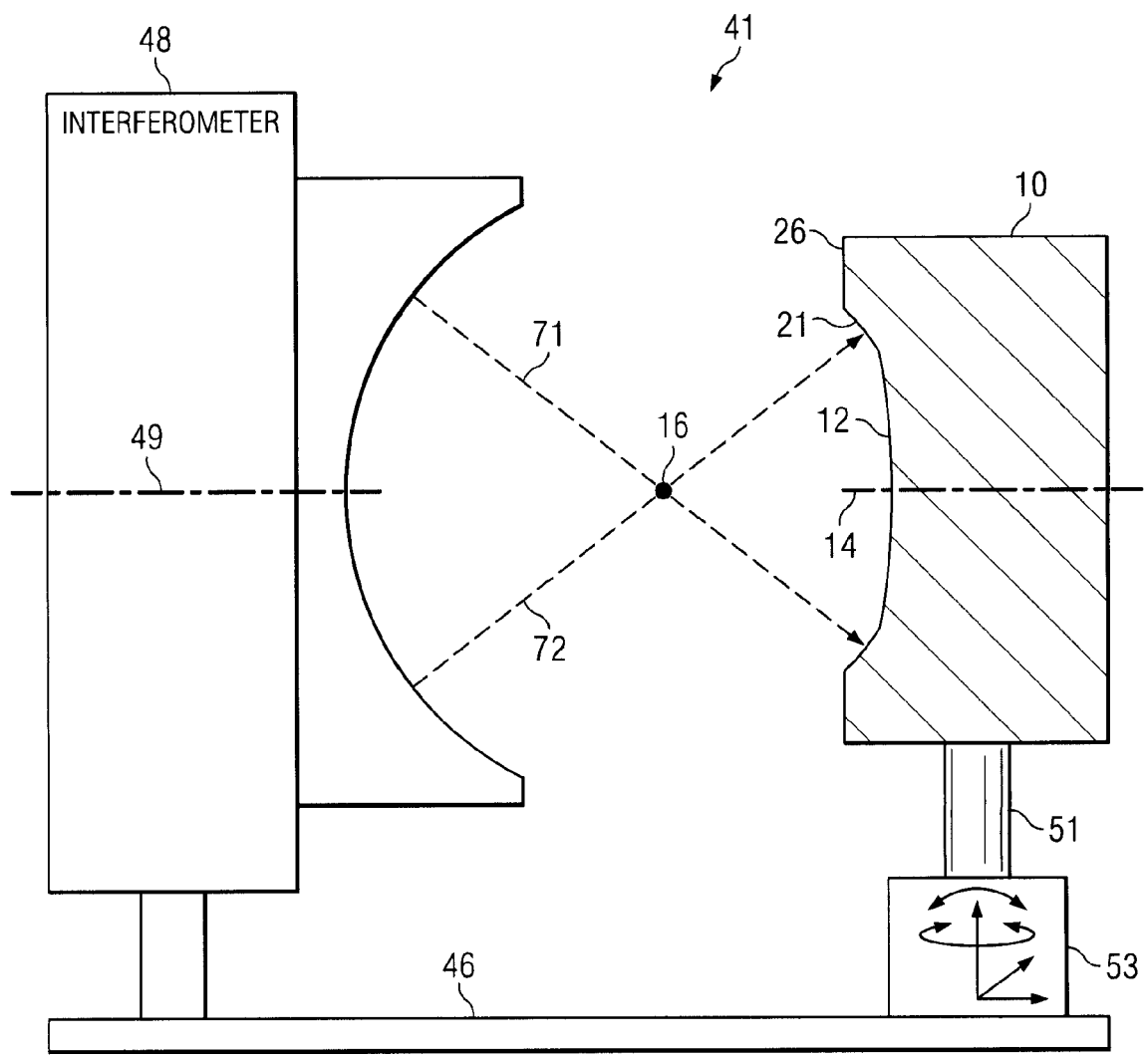
FIG. 3 is a diagrammatic view similar to FIG. 2, but showing the next operation in the sequence.

FIG. 3 is a diagrammatic view similar to FIG. 2, but showing the next operation in the positioning sequence. In this operation, the interferometer 48 is set to generate a spherical wave rather than a flat wave, as indicated diagrammatically by broken-line arrows 71 and 72 in FIG. 3. The annular spherical reference surface 21 reflects a portion of this spherical wave. The interferometer 48 is used to monitor the reflections from the reference surface 21. While monitoring the results of the analysis being performed by the interferometer, the mechanism 53 is used to adjust the workpiece 10 in relation to the interferometer 48, in directions parallel to one or more of the axes of the Cartesian coordinate system, until each ray of radiation arriving at the surface 21 is reflected back along exactly the same path of travel by which it arrived at the surface 21. When this state is achieved, the centerpoint of the spherical wave (where the arrows 71 and 72 intersect) will be exactly coincident with the centerpoint 16 of the spherical reference surface 21, which as discussed above is also the focus of the parabolic surface 12.

Figure 4:
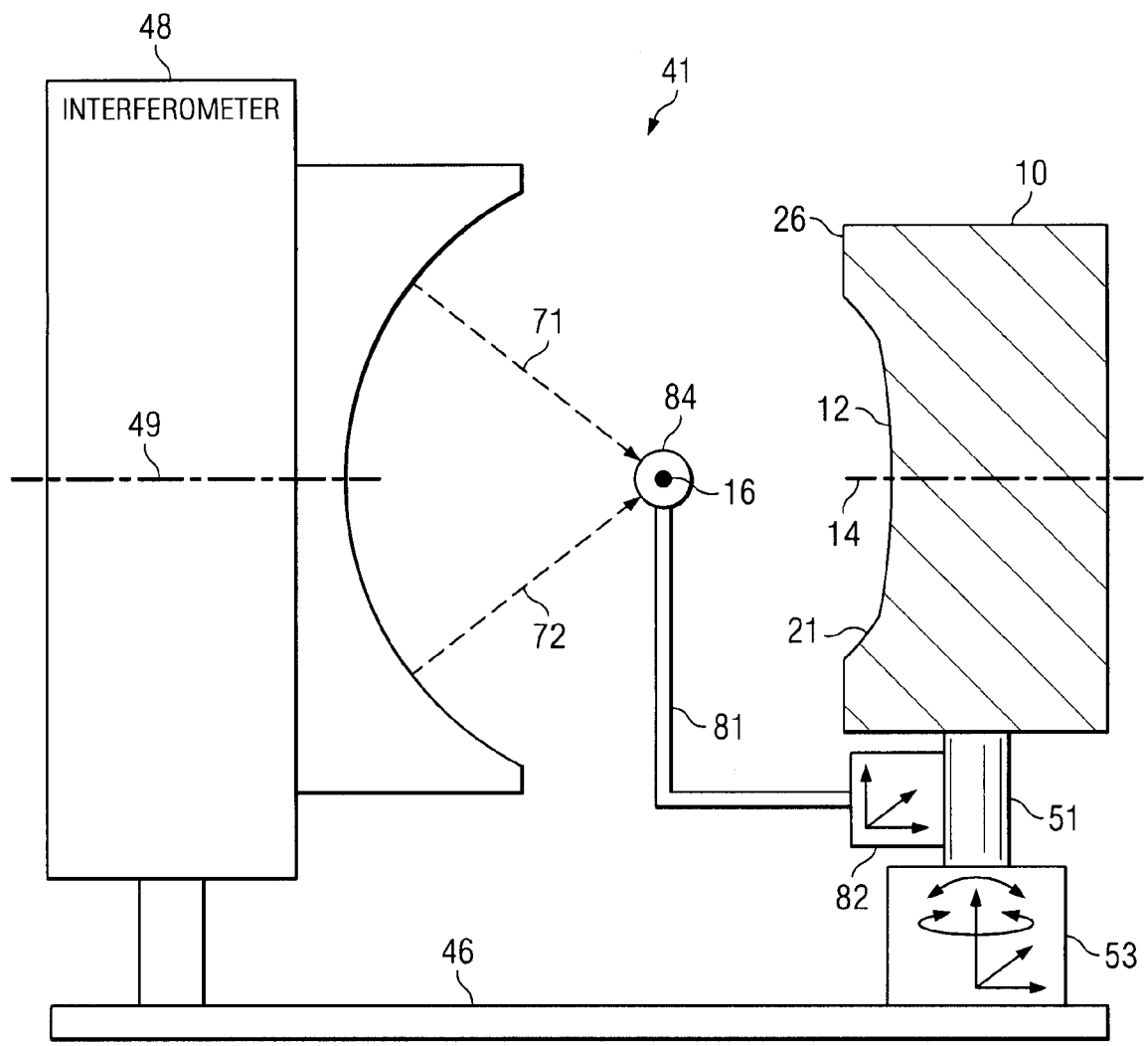
FIG. 4 is a diagrammatic view similar to FIGS. 2 and 3, but also showing additional structure of the test apparatus, and the next operation in the sequence.

FIG. 4 is a diagrammatic view similar to FIGS. 2 and 3, but also showing an additional structural component of the test apparatus 41. In particular, the test apparatus 41 has a stage that includes both a member 81, and a 3-axis support mechanism 82 that supports the member 81 for movement relative to the member 51. The mechanism 82 supports the member 81 for linear movement parallel to any of three axes of a Cartesian coordinate system. A reflective spherical ball 84 is fixedly mounted to the member 81, at an outer end of the member remote from the support mechanism 82. The reflective spherical ball 84 is commonly called a "retro" ball.

With reference to FIG. 4, in the next operation of the test sequence, the mechanism 53 maintains the workpiece 10 in the position that was obtained during the operation discussed above in association with FIG. 3. The interferometer 48 still generates the spherical wave, as represented diagrammatically by the broken-line arrows 71 and 72. The mechanism 82 is used to move the retro ball 84 until every ray of the interferometer's spherical wave impinges on the outer surface of the retro ball 84 exactly perpendicular to that surface. Consequently, in that position of the retro ball, every ray of the spherical wave impinging on the surface of the retro ball be reflected back along exactly the same path of travel by which it arrived at the retro ball 84. When the interferometer 48 detects that this condition has been achieved, the centerpoint of the retro ball 84 will be precisely coincident with the centerpoint of the spherical wave and with the focus 16 of the parabolic surface 12.

Figure 5:
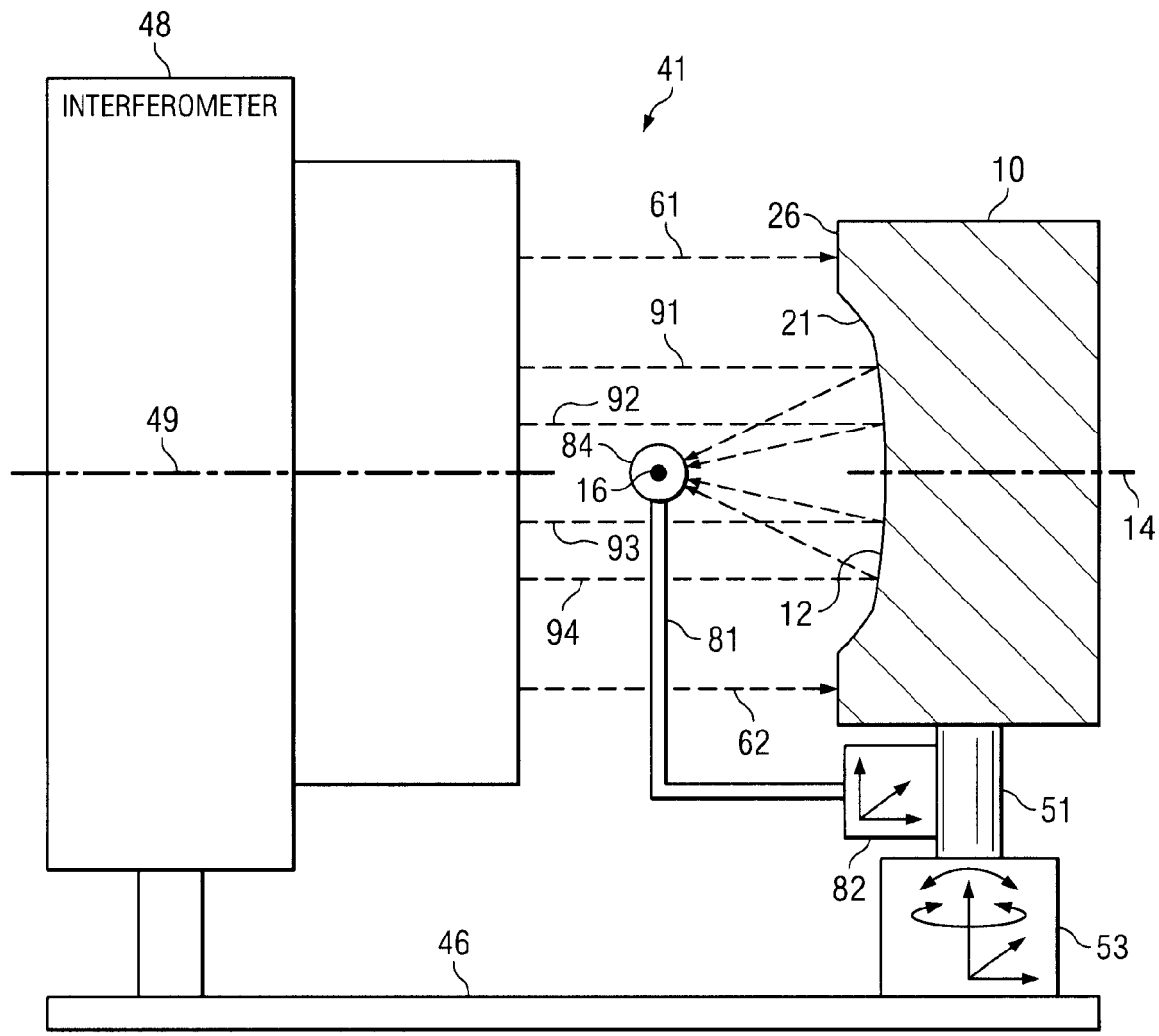
FIG. 5 is a diagrammatic view similar to FIG. 4, but showing two remaining operations of the sequence.

FIG. 5 is a diagrammatic view similar to FIG. 4, but showing two remaining operations of the test sequence. In FIG. 5, the interferometer 48 is again set to produce a flat wave, as indicated diagrammatically by the broken-line arrows 61, 62, 91, 92, 93 and 94. Initially, the interferometer 48 is used to monitor portions of this flat wave that are reflected by the annular planar reference surface 26 on the workpiece 10, in essentially the same manner discussed above in association with FIG. 2. It may be found that the planar reference surface 26 is still perpendicular to the axis 49 of the interferometer 48. But if not, the mechanism 53 is used to tilt the workpiece 10 as well as the retro ball 84 until the planar surface 26 is again perpendicular to the axis 49. The mechanism 82 keeps the retro ball 84 stationary in relation to the workpiece 10, or in other words keeps the centerpoint of the retro ball at the focus 16 of the surface 12.

As the workpiece 10 is tilted to cause the planar reference surface 26 to become perpendicular to the axis 49, the focus 16 may move radially away from the axis 49 of the interferometer 48. However, since the interferometer 48 is generating a flat wave at this point, it is not necessary that the axis 49 extend through the focus 16. It is only necessary that the axis 14 of the workpiece 10 be parallel to, but not necessarily coaxial with, the axis 49 of the interferometer 48.

Then, when it is clear that the axes 14 and 49 are parallel, the attention of the interferometer 48 is shifted from portions 61 and 62 of the flat wave that are being reflected by the planar reference surface 26 to other portions 91-94 of the flat wave that are being reflected by the parabolic surface 12. By definition, when a ray of radiation is traveling parallel to the axis of a parabolic surface, and is reflected by any point on the parabolic surface, the radiation will then travel directly toward the focus of that parabolic surface. Consequently, if the parabolic surface 12 has been accurately machined, each of the rays 91-94 will be reflected by the surface 12 and will travel directly toward the focus 16. Consequently, each ray will then impinge on the surface of the retro ball 84 exactly perpendicular thereto, and will be reflected to travel back to the interferometer 48 along exactly the same path of travel by which it arrived at the interferometer 48.

If the interferometer 48 finds that each of the rays 91-94 is returning to exactly the same point from which it originated, then it can be concluded that the surface 12 has been accurately machined. On the other hand, if the interferometer 48 determines that some rays are arriving back at points different from where they originated, then it means that the surface 12 was not accurately machined, and has an aberration. The error measured by the interferometer will, of course, be twice the actual error, because the radiation from the interferometer will have been reflected twice by the surface region having the aberration. In particular, the surface region with the aberration will reflect the radiation once as the radiation travels from the interferometer 48 to the retro ball 84, and will then reflect it again as the radiation travels from the retro ball back to the interferometer).

Figure 6:
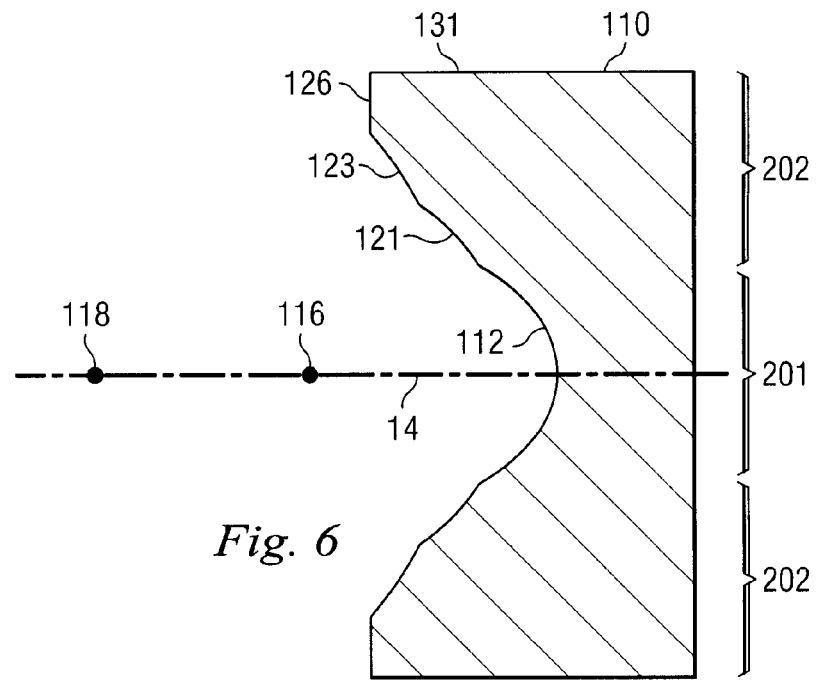
FIG. 6 is a diagrammatic sectional side view of a workpiece that is an alternative embodiment of the workpiece of FIG. 1.

FIG. 6 is a diagrammatic sectional side view of a workpiece 110 that is an alternative embodiment of the workpiece 10 of FIG. 1. The workpiece 110 has a reflective optical surface 112 that, like the surface 12, is a conic surface. However, the surface 112 is an ellipsoid, rather than a paraboloid of revolution. In other words, the surface 112 has a shape that is defined in space when an ellipse is rotated about its major axis 14. By definition, an ellipse has two spaced foci that each lie on the major axis. In FIG. 6, one focus is shown at 116, and the other at 118.

The workpiece 110 has an annular reflective optical surface 121 that encircles the surface 112, and that serves as a reference surface in a manner explained later. The surface 121 is a portion of a spherical surface having its centerpoint coincident with the focus 116 of the surface 112. The workpiece 10 also has a further annular reflective optical surface 123 that encircles the surfaces 112 and 121, and that serves as a reference surface, in a manner explained later. The surface 123 is a portion of a spherical surface having its centerpoint coincident with the focus 118 of the surface 112.

The workpiece 110 has an annular reflective planar surface 126 that encircles the surfaces 112, 121 and 123, that is normal to the axis 14, and that serves as a reference surface in a manner explained later. The workpiece 110 also has a radially outwardly facing cylindrical side surface 131.

In the disclosed embodiment, the workpiece 110 is made from a block of aluminum, and the surfaces 112, 121, 123 and 126 are machined thereon by diamond point turning while the workpiece 110 remains mounted in a machine tool. Alternatively, however, the workpiece 110 can be made of any other suitable material, and could be fabricated in any other suitable manner. After the workpiece 110 has been fabricated, it is desirable to test the ellipsoid surface 112 for accuracy. In the disclosed embodiment, this is carried out by a sequence of operations that is described below.

Figure 7:
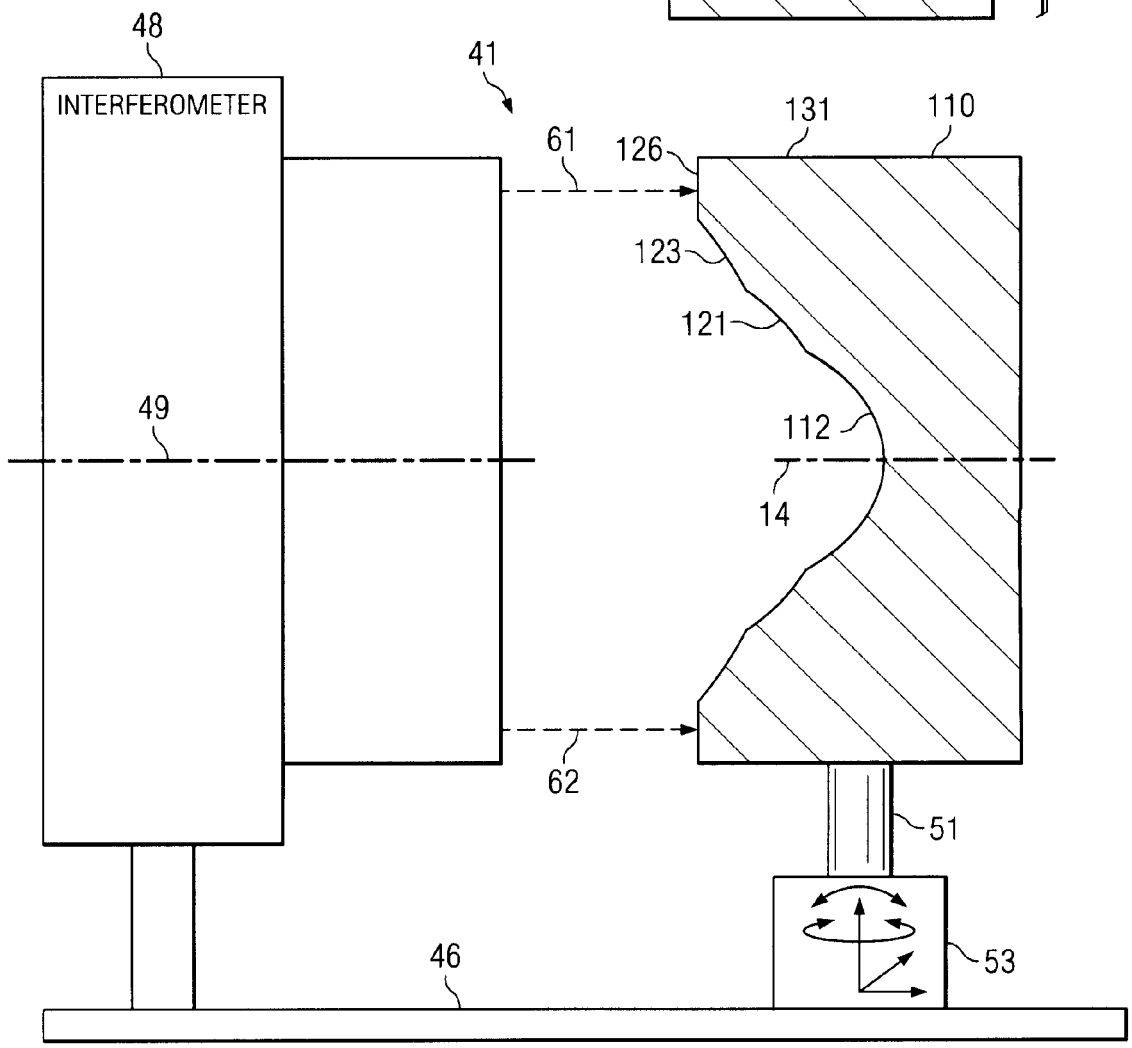
FIG. 7 is a diagrammatic side view similar to FIG. 2, except that the test apparatus supports the workpiece of FIG. 6 rather than the workpiece of FIG. 1.

FIG. 7 is a diagrammatic view that is similar to FIG. 2, except that the test apparatus 41 supports the workpiece 110 rather than the workpiece 10. FIG. 7 shows the first operation of the test sequence, in which the interferometer 48 generates a flat wave represented by broken-line arrows 61 and 62. The portions of this flat wave reflected by the annular planar reference surface 126 on the workpiece are monitored by the interferometer, and the mechanism 53 is used to adjust the orientation of the workpiece 110 relative to the interferometer 48 until the axis 14 of the workpiece 110 is parallel to the axis 49 of the interferometer 48. As discussed above, this does not necessarily mean that the parallel axes 14 and 49 are also necessarily coaxial.

Figure 8:
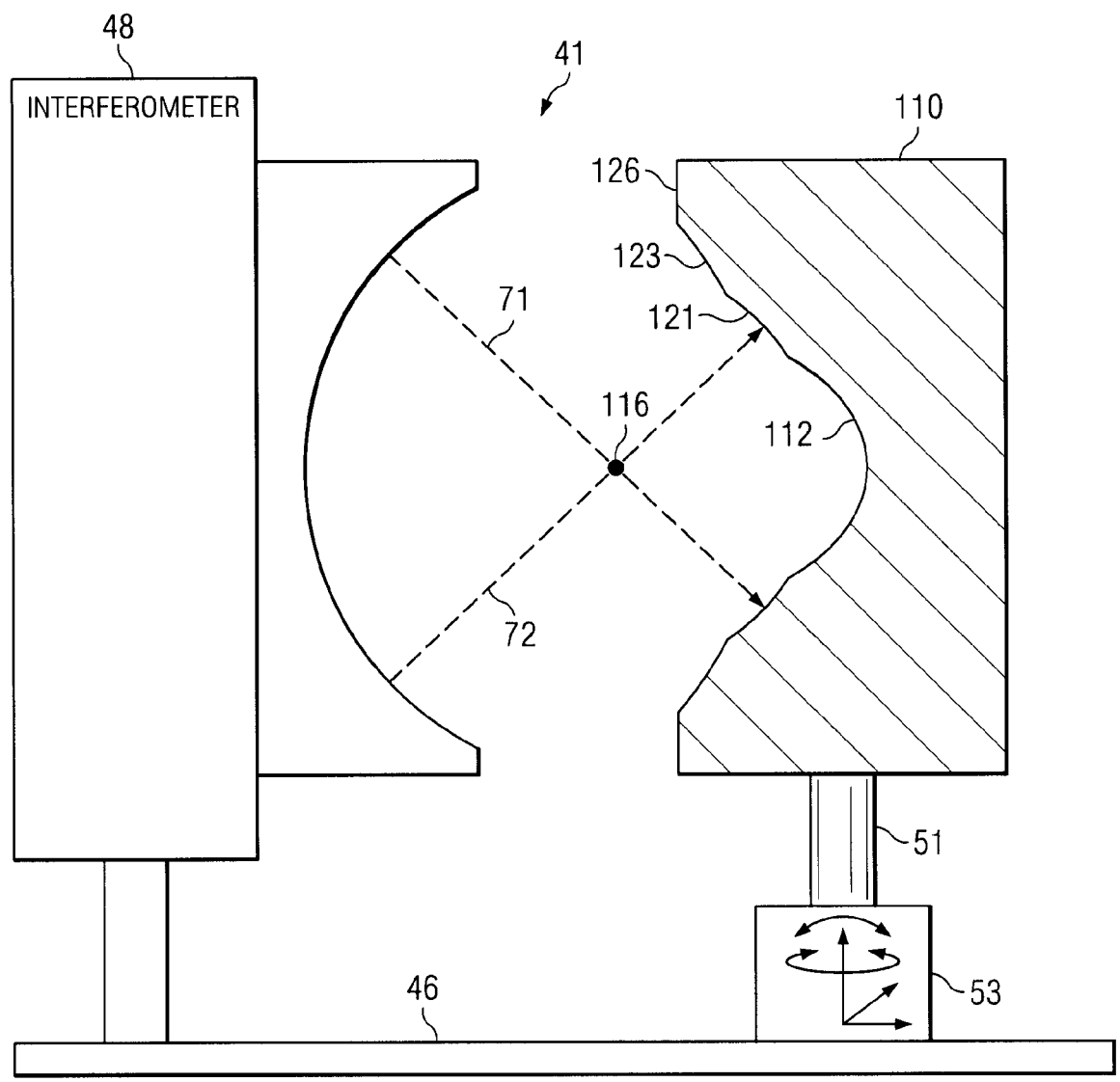
FIG. 8 is a diagrammatic view similar to FIG. 7, but showing the next operation in the sequence.

FIG. 8 is a diagrammatic view similar to FIG. 7, but showing the next operation in the test sequence. In FIG. 8, the interferometer 48 is set to produce a spherical wave rather than a flat wave, as indicated diagrammatically by the broke-line arrows 71 and 72, The interferometer 48 monitors reflections from the spherical surface 121, and the mechanism 53 is used to adjust the position of the workpiece 110 until the centerpoint of the spherical wave (where arrows 71 and 72 intersect) is coincident with the centerpoint of the spherical surface 121, this centerpoint also being the focus 116 of the ellipsoid surface 112.

Figure 9:
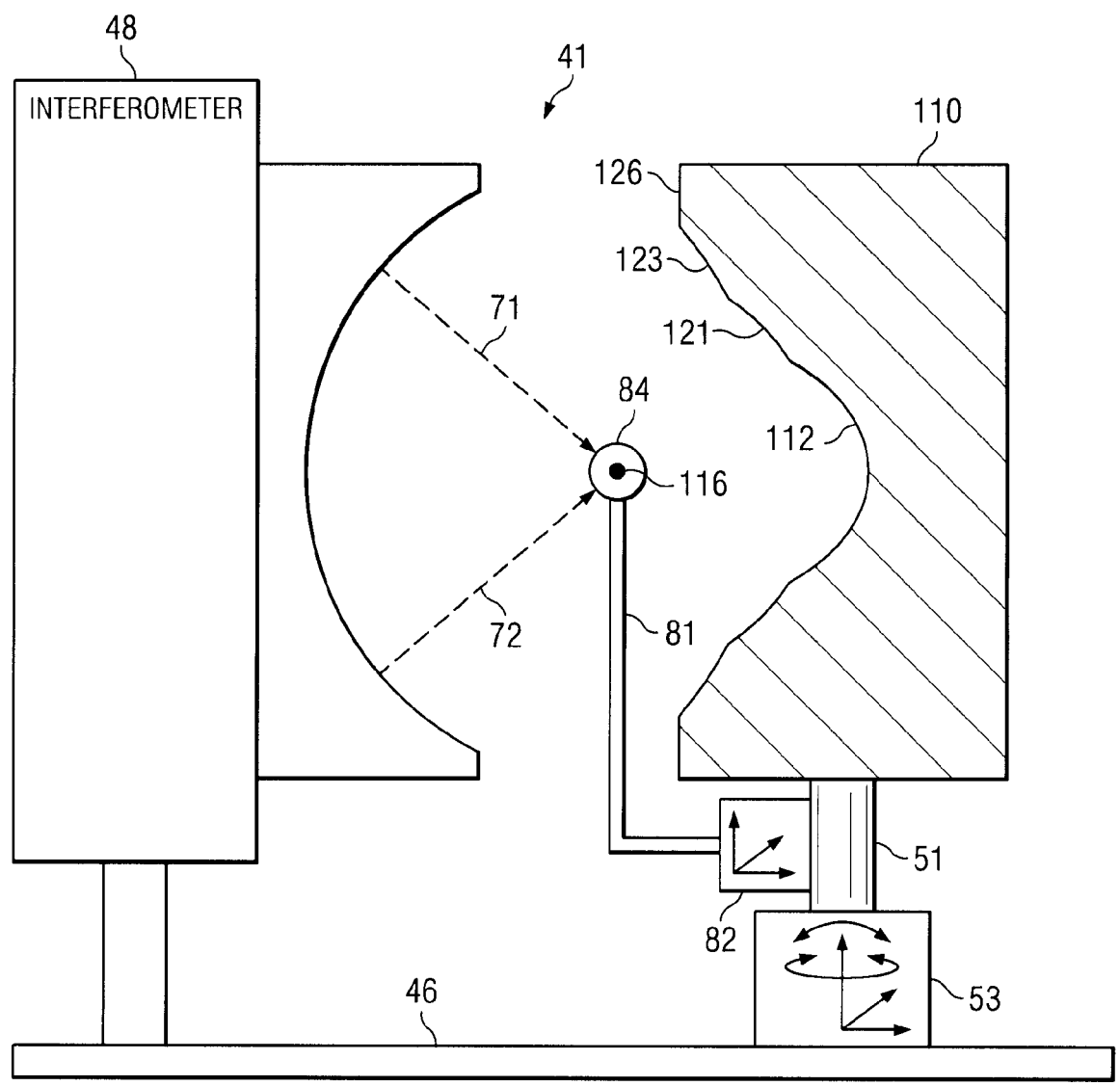
FIG. 9 is a diagrammatic view similar to FIGS. 7 and 8, but also showing the additional structure of the test apparatus, and showing the next operation in the sequence.

FIG. 9 is a diagrammatic view similar to FIGS. 7 and 8, but showing the additional structure of the test apparatus 41, including the retro ball 84, member 81 and support mechanism 82. In FIG. 9, the interferometer 48 continues to generate a spherical wave, represented by the arrows 71 and 72. While the mechanism 53 holds the workpiece 110 stationary with respect to the interferometer 48, the mechanism 82 is used to adjust the position of the retro ball 84 until its centerpoint is coincident with the focus 116, in a manner similar to that discussed above in association with FIG. 4.

Figure 10:
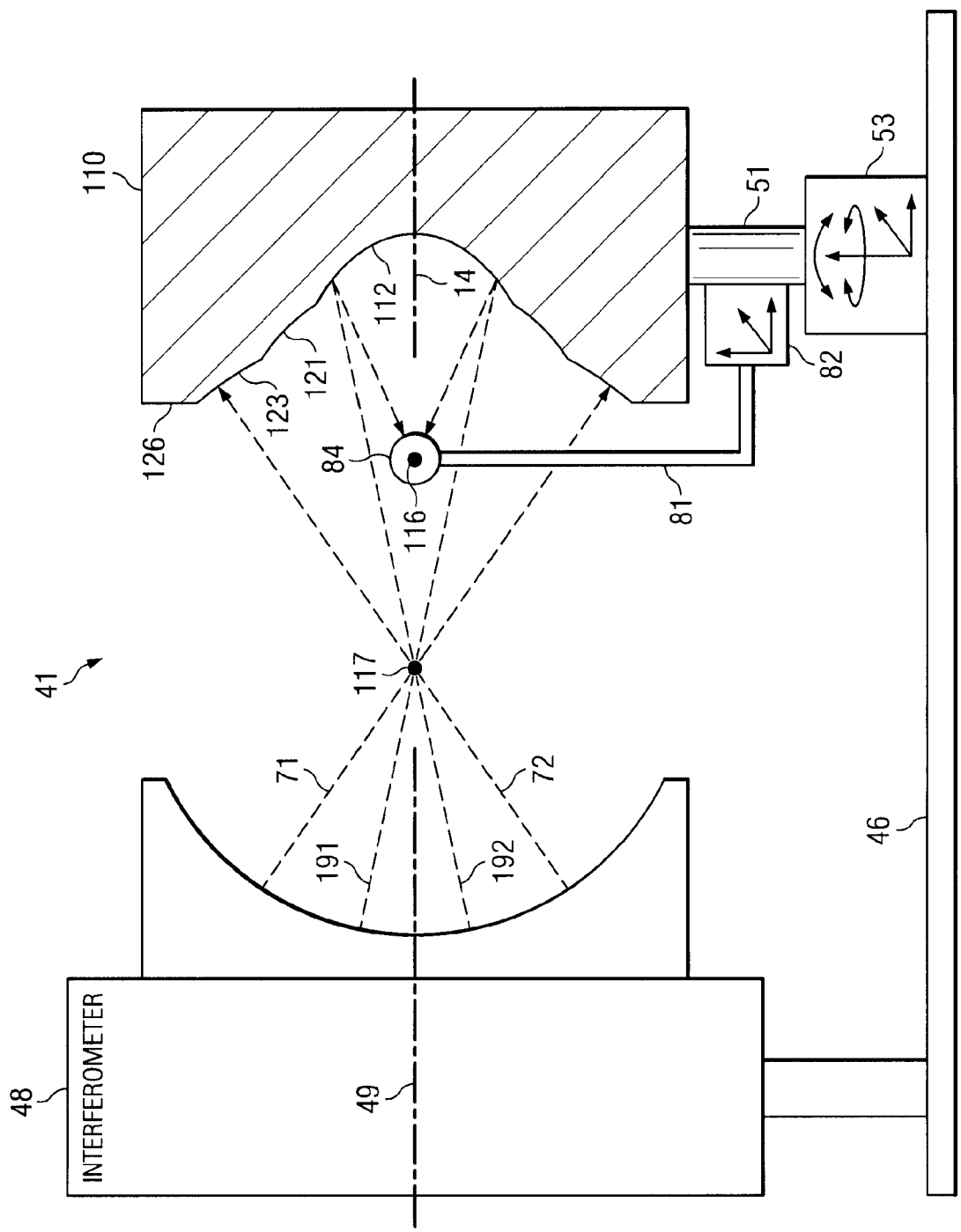
FIG. 10 is a diagrammatic view similar to FIG. 9, but showing the next operation in the sequence.

FIG. 10 is a diagrammatic view similar to FIG. 9, but showing the next operation in the test sequence. More specifically, the interferometer 48 continues to generate a spherical wave, as indicated diagrammatically by arrows 71 and 72.

The mechanism 82 keeps the retro ball 84 from moving relative to the workpiece 110, so that the centerpoint of the retro ball 84 remains positioned at the focus 116 of the ellipsoid surface 112. The interferometer 48 monitors reflections from the spherical reference surface 123 on the workpiece 110. The distance between the foci 116 and 117 of the surface 112 is known, and the mechanism 53 therefore moves the workpiece 110 approximately linearly by this distance in a rightward direction in FIG. 10, parallel to the axis 49 of the interferometer 48. The mechanism 53 then adjusts the position of the workpiece 110 along with retro ball 84 as necessary (without moving the retro ball relative to the workpiece), until the focus 117 is coincident with the centerpoint of the spherical wave 71 and 72.

The interferometer 48 then shifts its attention from portions 71-72 of the spherical wave that are being reflected by spherical surface 123 to other portions 191 and 192 of the same spherical wave that are being reflected by the ellipsoid surface 112. As is well known, if a ray of radiation passes through either focus of an ellipsoid surface and then is reflected by the ellipsoid surface, the ray will then travel directly toward the other focus of the surface. Thus, assuming that the surface 112 was accurately machined, rays such as those at 191 and 192 will each pass through the focus 117, will be reflected by the surface 112, and will then travel directly toward the other focus 116, impinging on the surface of retro ball 84 exactly perpendicular to that surface. Each ray will then be reflected by the retro ball 84 to travel back along precisely the same path of travel by which it arrived at the retro ball 84. In particular, each ray will be reflected by the surface 112, pass through focus 117, and then arrive back at the interferometer 48 at exactly the same point from which it originated.

If the interferometer 48 determines that all rays associated with the surface 112 are arriving back at exactly the same points from which they originated, then the interferometer will know that the surface 112 was accurately machined. On the other hand, if some of the rays are arriving back at points that are different from the points where those rays originated, the interferometer 48 will know that the surface 112 has an aberration and is not accurate. As discussed earlier, the error measured by the interferometer will be twice the actual error, because the radiation will be reflected twice by the surface region with the aberration.

Referring again to FIG. 6, the workpiece 110 has a cylindrical central portion 201 with the ellipsoid surface 112 thereon, and the central portion 201 is surrounded by an annular portion 202 that has the reference surfaces 121, 123 and 126 thereon. After the accuracy of the ellipsoid surface 112 has been tested and verified in the manner discussed above in association with FIGS. 7-10, the portion 202 of the workpiece 110 that carries the reference surfaces can optionally be removed, for example by cutting or machining, or in some other suitable manner, leaving only the cylindrical central portion 201 with the ellipsoid surface 112 thereon.

Figure 11:
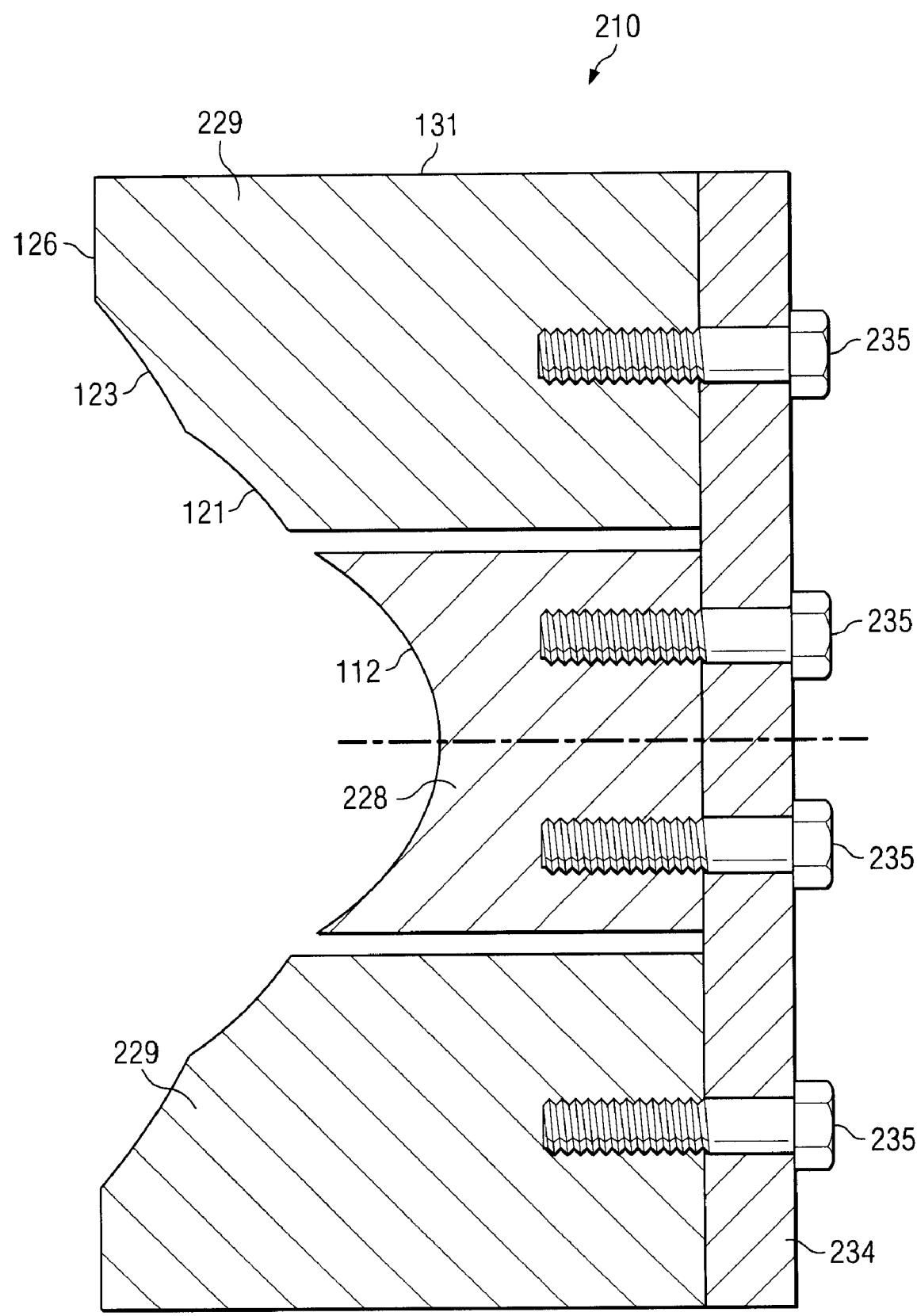
FIG. 11 is a diagrammatic sectional side view of a workpiece that is a further alternative embodiment of the workpieces shown in FIGS. 1 and 6.

FIG. 11 is a diagrammatic sectional side view of a workpiece 210 that is an alternative embodiment of the workpiece 110 of FIG. 6. The workpiece 210 includes a cylindrical central portion 228 that has the ellipsoid surface 112 thereon, and includes an annular outer portion 229 that encircles the central portion 228, and that has the reference surfaces 121, 123 and 126 thereon. A rigid plate 234 is disposed against the rear surface of each of the portions 228 and 229, and is fixedly and removably secured to each of the portions 228 and 229 by several bolts 235. After the portions 228 and 229 are bolted to the plate 234, the workpiece 210 is mounted in a machine tool, and then the optical surfaces 112, 121, 123 and 126 are machined thereon. The optical surface 112 is then tested in the manner described above in association with FIGS. 7-10. When this testing is complete, and the accuracy of the ellipsoid surface 112 has been verified, the bolts 235 can optionally be removed, so that the portion 228 with the surface 112 thereon can be easily separated from the portion 229 with the reference surfaces 121, 123 and 126 thereon.

In the foregoing discussion, it has been assumed for simplicity that the spherical reference surfaces 21, 121 and 123 are all accurate. As a practical matter, however, the interferometer 48 can optionally be used in a conventional manner to verify the accuracy and the radius of each of the spherical reference surfaces 21, 121 and 123.

Although selected embodiments have been illustrated and described in detail, it should be understood that a variety of substitutions and alterations are possible without departing from the spirit and scope of the present invention, as defined by the claims that follow.

What is claimed is:

1. An apparatus comprising a part having first and second surfaces that are reflective, said first surface being a portion of a conic surface that is a surface of revolution about an axis and that has a focus at a selected point on said axis, and said second surface being a portion of a spherical surface that has a centerpoint at said selected point.

2. An apparatus according to claim 1, wherein said part has first and second portions that are fixedly and separably coupled to each other, said first portion having said first surface thereon, and said second portion having said second surface thereon.

3. An apparatus according to claim 1, wherein said part has thereon a third surface that is planar, and that extends substantially normal to said axis.

4. An apparatus according to claim 3, wherein said part has first and second portions that are fixedly and separably coupled to each other, said first portion having said first surface thereon, and said second portion having said second and third surfaces thereon.

5. An apparatus according to claim 1, wherein said first surface is a paraboloid of revolution.

6. An apparatus according to claim 1, wherein said first surface is an ellipsoid.

7. An apparatus according to claim 6,
wherein said first surface has a further focus at a further point on said axis that is spaced from said selected point; and
wherein said part has a third surface that is reflective, and that is a portion of a spherical surface having a centerpoint at said further point on said axis.

8. An apparatus according to claim 7, wherein said part has first and second portions that are fixedly and separably coupled to each other, said first portion having said first surface thereon, and said second portion having said second and third surfaces thereon.

9. A method comprising:
fabricating a part having first and second surfaces that are reflective, said first surface being a portion of a conic surface that is a surface of revolution about an axis and that has a focus at a selected point on said axis, and said second surface being a portion of a spherical surface that has a centerpoint at said selected point;
thereafter using said second surface to position said part with respect to an interferometer generating a spherical wave so that a centerpoint of the spherical wave is coincident with said selected point;
thereafter using a reflective further surface that is provided on a member and that is a portion of a spherical surface to position the member with respect to the interferometer generating the spherical wave so that a centerpoint of said further surface is at said selected point with respect to said part; and
thereafter using the interferometer to evaluate said first surface for accuracy.

10. A method according to claim 9,
wherein said fabricating is carried out so said first surface is a paraboloid of revolution, and so said part has a third surface that is reflective, that is planar, and that is perpendicular to said axis; and
wherein said using the interferometer to evaluate said first surface includes generating a planar wave with the interferometer, using said third surface to position said part and said member so that said axis is parallel to a direction of travel of radiation in said planar wave, and thereafter causing said interferometer to analyze radiation of said planar wave that is returned to the interferometer after being successively reflected by said first surface, said further surface, and said first surface.

11. A method according to claim 10, including, after said fabricating and before said using of said second surface to position said part:
generating a planar wave with the interferometer; and
using said third surface to position said part so that said axis is parallel to a direction of travel of radiation in said planar wave.

12. A method according to claim 9,
wherein said fabricating is carried out so said first surface is an ellipsoid and has a further focus at a further point on said axis that is spaced from said selected point, and so said part has a reflective third surface that is a portion of a spherical surface having a centerpoint at said further point on said axis;
including, after said using said further surface to position said member and before said using the interferometer to evaluate said first surface, using said third surface to position said part with respect to the interferometer generating a spherical wave so that a centerpoint of the spherical wave is coincident with said further point; and
wherein said using the interferometer to evaluate said first surface includes generating a spherical wave and causing said interferometer to analyze radiation of said spherical wave that is returned to the interferometer after being successively reflected by said first surface, said further surface, and said first surface.

13. A method according to claim 12,
wherein said fabricating of said part is carried out so said part has a fourth surface that is reflective, that is planar, and that is perpendicular to said axis; and
including, after said fabricating and before said using of said second surface to position said part, generating a planar wave with the interferometer, and using said fourth surface to position said part so that said axis is parallel to a direction of travel of radiation in said planar wave.

14. A method according to claim 9,
wherein said fabricating is carried out so that said part has first and second portions that are fixedly and separably coupled to each other, said first portion having said first surface thereon, and said second portion having said second surface thereon; and
including, after said using of said interferometer to evaluate said first surface, separating said second portion from said first portion.

15. A method according to claim 14,
wherein said fabricating is carried out so that said first and second portions are respective integral portions of said part; and
wherein said separating of said first and second portions includes physically severing said second portion from said first portion.

16. A method according to claim 14,
wherein said fabricating is carried out so that said first and second portions are physically separate parts that are fixedly coupled to each other, and so that said first and second surfaces are formed while said first and second portions are physically coupled; and
wherein said separating of said first and second portions includes uncoupling said second portion from said first portion.

* * * * *